UNITED STATES PATENT OFFICE.

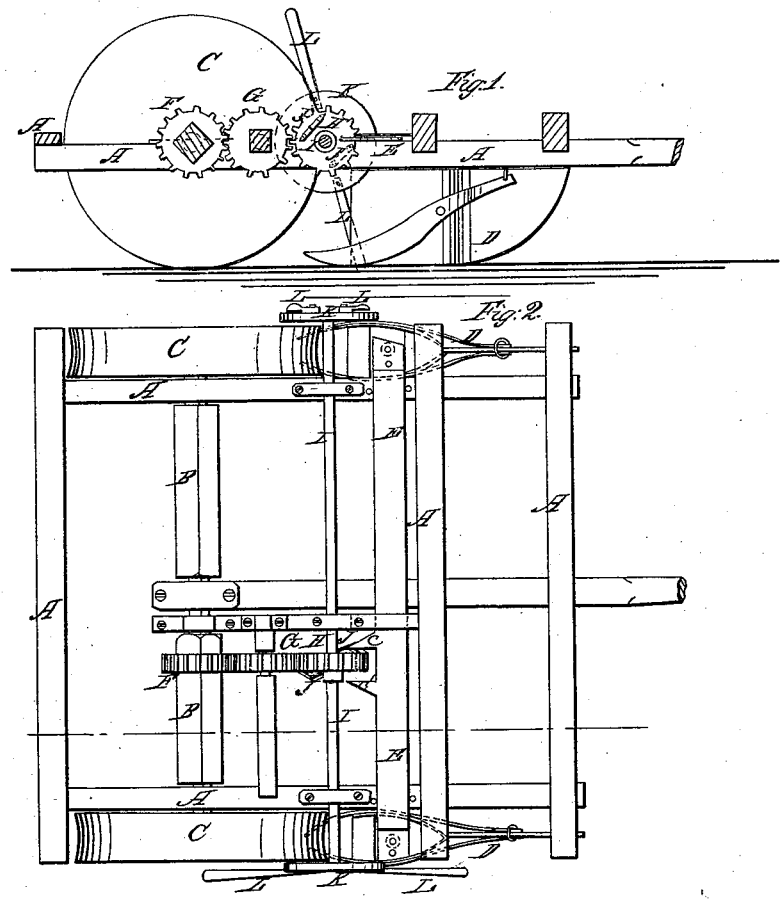

WILLIAM B. GOODWIN, OF KINMUNDY, ILLINOIS.

Letters Patent No. 85,581, dated January 5, 1869

IMPROVEMENT IN CORN-PLANTERS.

The Schedule referred to in these Letters Patent and making part of the same.

*To all whom it may concern:*

Be it known that I, WILLIAM B. GOODWIN, of Kinmundy, in the county of Marion, and State of Illinois, have invented a new and useful Improvement in Corn-Planters; and I do hereby declare that the following is a full, clear, and exact description thereof, which will enable others skilled in the art to make and use the same, reference being had to the accompanying drawings, forming part of this specification.

Figure 1 is a vertical longitudinal section of my improved corn-planter, taken through the line $x$-$x$, fig. 2.

Figure 2 is a top or plan view of the same.

Similar letters of reference indicate corresponding parts.

My invention has for its object to improve the construction of the parts of a corn-planter, by which the dropping-slides and marker-arms are operated, so as to make them more simple in construction, more effective in operation, and less liable to get out of order; and It consists in the construction and combination of said parts, as hereinafter more fully described.

A is the frame-work of my improved planter.

B is the axle, which revolves in bearings in the frame A.

C are the wheels, one of which is rigidly attached to and the other revolves loosely upon the axle B.

D are the plows, that open the furrows to receive the corn. The rear parts of the plows are made hollow or tubular, and are provided with a spreader, (not shown in the drawings,) to spread the corn as it drops to the ground.

E is the dropping-plate or bar, by which the corn is dropped, and which extends entirely across the frame A, so as to drop the corn from both hoppers at the same time.

The bar E is provided with projecting arms or lugs, $e'$, to receive the wheel by which the said bar is operated, as hereinafter more fully described.

F is a gear-wheel, placed upon the axle B, in such a manner that it may be moved back and forth to throw the gear-wheel F into and out of gear with the other gear-wheels.

G is a gear-wheel, revolving upon a journal attached to the frame A in such a position that the teeth of the gear-wheel G may mesh into the teeth of the gear-wheel F.

Into the teeth of the gear-wheel G, also mesh the teeth of the gear-wheel H, attached to the marker-shaft I.

The gear-wheel H is provided with inclined projections, J, formed upon or attached to its sides, which strike against the arms $e'$ of the dropping-bar E, to move the said bar back and forth at the proper time to drop the corn.

The shaft I revolves in bearings attached to the frame A, and to its projecting ends are attached disks or small wheels, K, the outer sides of which are grooved to receive the marker-arms L, which are secured in place by set-screws, so that the length of the arms L may be adjusted at pleasure, according to the depth at which the plows are to run in the ground.

The various operating-parts of the machine must be so constructed and arranged that the marker-arms L may come to the ground at the right time to mark the exact spots where the hills have been planted.

I claim as new, and desire to secure by Letters Patent—

1. The gear-wheel H, constructed substantially as herein shown and described, in combination with the marker-shaft I and dropping-bar E, and operated from the axle B by the gearing F G, as and for the purpose set forth.

2. The combination of the adjustable marker-arms L and grooved supporting-disks or wheels K with the marker-shaft I, substantially as herein shown and described, and for the purpose set forth.

WILLIAM B. GOODWIN.

Witnesses:
WM. A. HOUSEL,
JOSHUA GOODWIN.